Dec. 12, 1967   F. W. WEBER   3,358,236
PROGRAMMED TIMING CIRCUITS
Filed April 12, 1965   5 Sheets-Sheet 4

INVENTOR.
FRANK W. WEBER
BY
Christie, Parker & Hale
ATTORNEYS.

United States Patent Office 3,358,236
Patented Dec. 12, 1967

3,358,236
PROGRAMMED TIMING CIRCUITS
Frank W. Weber, Duarte, Calif., assignor to Burroughs
Corporation, Detroit, Mich., a corporation of Michigan
Filed Apr. 12, 1965, Ser. No. 447,170
16 Claims. (Cl. 328—58)

ABSTRACT OF THE DISCLOSURE

Pulse generating circuits wherein the duration or delay time of output signals generated by the circuits is determined by input signals applied thereto which are representative of the logic condition of associated circuitry. The pulse generating circuits include timing capacitors, the charging and discharging of which determine the duration or delay time of the output signals. The input signals control the charging and discharging of the timing capacitors by controlling, in respective embodiments, the value of current passing through the capacitors, the resistive values of resistors associated with the capacitors, the value of potential to which the capacitors charge, and the capacitive values of the capacitors.

This invention relates to improvements in electrical timing circuits and, more particularly, to such circuits in which particular resistance-capacitance networks used for timing control are selected by means of associated information signals.

Pulse generating circuits in which the pulse duration is controlled by means of a resistance-capacitance network are well-known. For example, a monostable multivibrator type circuit may be used to generate pulses of a specific duration controlled by the time constant, i.e., the product of the resistance R and capacitance C of an R-C network, and by the voltage differential through which the network discharges. In this type of circuit an input trigger pulse initiates a discharge-recharge cycle for the capacitor. The output pulse duration is generally controlled by the discharge time of the capacitor through the resistance of the discharge circuit, the output pulse and discharge time both commencing with the commencement of the trigger signal.

Another type of pulse generating circuit which is widely used in electronic systems to delay a pulse signal for a predetermined time interval is the electronic delay circuit. In this type of circuit an input trigger pulse also initiates a discharge-recharge cycle for a capacitor in an associated resistance-capacitance network. The specific delay time is controlled by the time constant of the network and also by the voltage differential through which the network charges. Moreover, the output pulse duration in this type of circuit continues beyond the termination of the trigger signal for a period of time equal to the delay time of the circuit. The recharge time of the capacitor generally commences with the termination of the trigger signal.

In many electronic systems, such as digital data processors, for example, it is necessary to generate output pulses of several different specific time durations or to delay pulse signals by several different predetermined periods of time. The particular pulse duration or delay time desired may, for example, be dependent upon the electrical condition of associated logic circuitry or upon signals from one or more sources of control signals.

Delay circuits and multivibrator circuits generally include a normally open input switch, the operation of which is controlled by input signals applied thereto, and a normally closed output switch coupled to the input switch. Coupled between the input and output switches is control circuitry including a timing capacitor. The circuits generate an output signal whenever the normally closed output switch is opened. In typical multivibrator circuits, the timing capacitor commences to discharge upon the application of an input signal and an output signal is generated which commences with the application of the input signal and terminates with the discharge of the capacitor. In typical delay circuits, on the other hand, the timing capacitor discharges immediately upon application of an input signal and commences to recharge upon termination of the input signal. The output signal which is generated commences upon application of the input signal and terminates when the capacitor has become recharged.

An advantage of the present invention is that it enables a pulse generating circuit of the multivibrator type to produce output signals of any of several predetermined time durations dependent upon the presence or absence of signals applied to control circuitry associated with the multivibrator. The present invention enables the circuit to generate any number of pulses having different predetermined time durations.

Another advantage of the present invention is that it enables a delay circuit to generate output pulses of differing predetermined delay periods dependent upon the presence or absence of signals applied to control circuitry associated with the circuit. In this arrangement too the present invention enables the circuit to generate output pulses having any number of different predetermined delay times.

The above and other advantages of the present invention are achieved by means of independent control of the time during which the timing capacitor maintains the normally closed output switch in an open condition. This control is achieved by means of changes effected in control circuitry connected to the timing capacitor. These changes in the control circuitry are in turn controlled by logic signals received from one or more associated circuits and may advantageously be representative of particular binary logical states assumed by the associated circuits. Thus, the presence of a particular signal may advantageously manifest that its associated logic circuit is in a "true" condition while the absence of a particular signal may similarly manifest that its associate logic circuit is in a "false" condition. Such control of the time during which the output switch remains closed renders pulse generating circuits in accordance with the present invention programmable. Thus, the particular predetermined time durations exhibited by the output signals of such circuits may be made dependent upon the logical state of associated logic circuits.

It is well known that the time in which a resistance-capacitance network is charged or discharged under constant current conditions is governed by the relationship $T=Q/I$. Where T represents the time of charge or discharge, Q represents the initial charge from which the capacitor is discharged or the final value to which it is charged, and I represents a constant value of charging or discharging current. Additionally, it is known that the time in which the capacitor C of a resistance-capacitance network charges in response to the application of a potential across the network of $V_s$ is given by the relationship $$T = RC \ln \frac{V_s}{V_s - V'}$$

where $V_s$ is the potential across the resistor R at the beginning of the charging period and $V_s - V'$ is the potential across the resistor R at the end of the charging period. Similarly, it is known that the time in which the capacitor C of a resistance-capacitance network discharges from one value of potential to another is given by the relationship $T = RC \ln V''/V$ where $V'$ is the potential across the resistor R at the beginning of the discharge period and V is the potential across the resistor R at the end of the discharge period. Thus, it can be seen that predetermined changes in the value of I, R, C, or V will produce corresponding predetermined changes in T. The present invention achieves such predetermined changes in T by means of changes in I, R, C, and V effected by logic signals representative of the "true" or "false" conditions of associated circuits. As a result, the duration or delay time of output signals generated by timing circuits in accordance with the present invention may be made to be of any number of different predetermined time durations in response to particular combinations of logic signals.

The manner of operation of the present invention and the manner in which it achieves the above and the other advantages may be more clearly understood by reference to the following detailed description when considered with the drawing, in which:

FIG. 7 depicts a delay circuit in which logic signals effect the charging of a timing capacitor to several different values of potential.

Transistors are utilized as the active elements in each of the circuits depicted in the drawing. Although transistors make excellent switches, the present invention is not to be considered limited to timing circuits in which transistors are employed. The present invention is applicable to any timing circuit in which pulses generated at an output switch by means of signals applied to an input switch exhibit a delay time or duration time dependent upon the state of control circuitry intermediate the input and output switches.

The transistor switches shown in the drawing are advantageously driven into saturation by input signals applied thereto to close the switches. When in a saturated condition, the collector potential of a transistor is intermediate its base potential and its emitter potential and is essentially equal to its emitter potential. Thus, when driven into saturation, the emitter and collector are at essentially the same potential and excellent switching action is therefore achieved.

Figure 1:
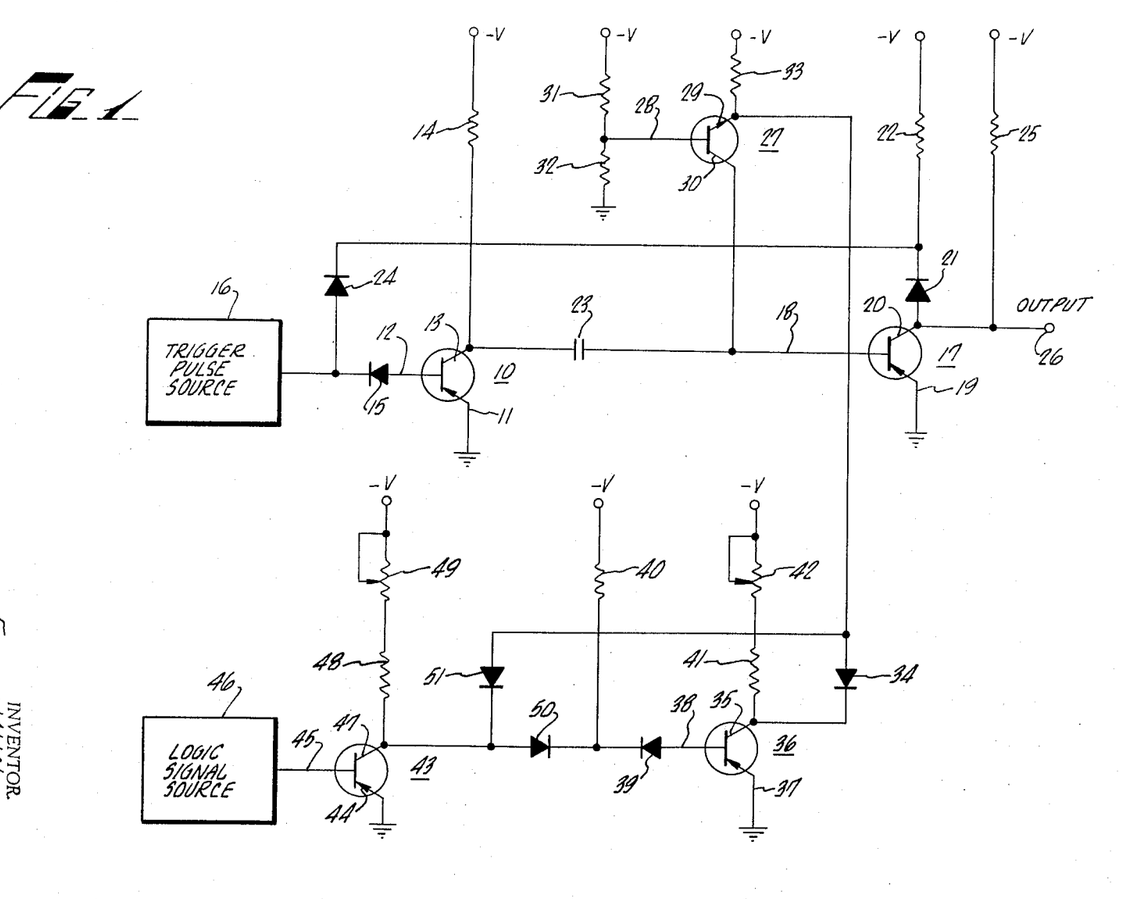
FIG. 1 depicts a multivibrator circuit in which logic signals effect discharge of a timing capacitor by several predetermined values of constant current.

FIG. 1 depicts a programmable multivibrator circuit in accordance with the principles of the present invention. It includes an input switch and an output switch, a timing capacitor coupled therebetween and control circuitary coupled to the capacitor for governing the period of the multivibrator.

The input switch includes a PNP transistor 10 having an emitter 11, base 12, and collector 13. Emitter 11 is connected directly to a ground reference potential and collector 13 is connected through biasing resistor 14 to a source of negative potential represented as —V. The base 12 is connected through diode 15 to trigger pulse source 16. The output switch includes a PNP transistor 17 having a base element 18, emitter 19, and collector 20. The emitter 19 is also connected directly to ground potential while the collector 20 is connected through diode 21 and resistor 22 to the source of negative potential —V. Coupled between the two switches is timing capacitor 23 connected between collector 13 of transistor 10 and base 18 of transistor 17. Additionally feedback diode 24 is connected between the junction of diode 15 and source 16 and the junction of diode 21 and resistor 22. Collector 20 of transistor 17 is also connected to the source of negative potential —V through resistor 25. Output terminal 26 is located at the junction of collector 20 and resistor 25.

The control circuitry includes NPN transistor 27 having a base element 28, emitter 29, and collector 30. Base 28 is connected to the junction of voltage divider resistors 31 and 32 which are connected between ground potential and the source of negative potential —V. The collector 30 is connected to the junction of capacitor 23 and the base 18 of transistor 17. The emitter 29 is connected through resistor 33 to the source of negative potential —V and is also connected via diode 34 to the collector 35 of PNP transistor 36. Transistor 36 has its emitter 37 connected directly to ground potential and its base 38 connected via diode 39 and resistor 40 to the source of negative voltage —V. Collector 35 of transistor 36 is also connected to the source of negative potential —V through resistor 41 and variable resistor 42.

A PNP transistor 43 has its emitter element 44 connected directly to ground potential, its base 45 connected to a source of logic pulses 46 and its collector 47 connected to the source of negative potential —V through resistor 48 and variable resistor 49. Additionally, collector 47 is connected to the junction of diode 39 and resistor 40 by diode 50. Finally, emitter 29 of transistor 27 is also connected to the junction of resistor 48 and diode 50 by diode 51. The diodes are poled as depicted in FIG. 1.

Trigger pulse source 16 is shown in block diagram form and may represent any well known circuit capable of applying negative signals to base 12 of transistor 10 sufficient to saturate this transistor. Similarly, logic signal source 46 is shown in block diagram form and may represent any well known means for presenting signals to base 45 of transistor 43 indicative of the state of associated logic circuitry. Advantageously, the "true" state may be represented by a negative potential applied to base 45 sufficient to saturate transistor 43 while the "false" state is represented by ground potential applied to base 45.

In the operation of the circuit depicted in FIG. 1, transistor 27 is always maintained in the conducting state. This results since the base 28 of this transistor is held at a constant negative potential of a value smaller than —V by the voltage dividing resistors 31 and 32. Since emitter 29 of this transistor is connected to potential —V via resistor 33, the base 28 is held at a potential sufficient to maintain transistor 27 in the saturated conducting state. Transistor 17 is normally also in a conductive state. Since base 18 of this transistor is connected to collector 30 of the always conductive transistor 27, the base 18 is normally at a potential which is somewhat negative with respect to ground. As a result, transistor 17 will be in a saturated conducting state and its collector 20 will be at ground potential. Similarly, output terminal 26 is also at ground potential.

Transistor 10 is normally in a non-conducting state. However, upon the application of a negative trigger signal from pulse source 16 to its base element 12, this transistor is switched to the saturated conducting state. As a result, its collector 13 which previously was at a potential approximately equal to —V will, upon the switching of transistor 10, have ground potential applied thereto. This nearly instantaneous change in potential of collector 13 will be reflected across capacitor 23 to base 18 of transistor 17 thereby turning off transistor 17.

The turning off of transistor 17 removes ground potential from its collector 20 and output terminal 26, thereby enabling the source of negative potential —V to establish a negative output signal at output terminal 26.

This output signal will exist for the delay period of the multivibrator circuit. The length of this delay period is determined by the presence or absence of a signal applied from pulse source 46, as described hereafter.

The diode 24 connected between the junction of diode 15 and trigger pulse source 16 and the junction of diode 21 and resistor 22 serves to maintain transistor 10 in the conducting condition subsequent to the termination of the pulse from source 16 and for as long as transistor 17 remains non-conducting. Diode 24 thus maintains base 12 of transistor 10 at a negative potential throughout the delay period of the multivibrator.

During the delay period of the multivibrator shown in FIG. 1, transistor 10 remains in the conducting condition and transistor 17 in the non-conducting condition. During this period capacitor 23 discharges. Upon the discharge of capacitor 23, base 18 of transistor 17 will again reach a potential which is negative with respect to ground and transistor 17 will revert to its conducting state. As a result, a negative voltage sufficient to hold transistor 10 in a conducting state will no longer be coupled to base 12 of transistor 10 by diode 24 and the transistor 10 will revert to its non-conducting state. The length of time required for the discharge of capacitor 23 is dependent on the presence or absence of a negative signal from source 46.

If the absence of a negative signal from source 46 is assumed to indicate that associated logic circuitry is in a "false" condition, then capacitor 23 will discharge through the parallel combination of resistance 33 and series resistances 48 and 49. If, on the other hand, a negative signal is applied from source 46 indicating that associated logic circuitry is in the "true" condition, then, as described hereinafter, capacitor 23 will discharge through the parallel combination of resistance 33 and series resistances 41 and 42. The time in which capacitor 23 discharges and the consequent delay time of the multivibrator circuit is dependent upon the values of resistance through which it discharges and hence may be made to depend upon whether the associated logic circuitry is in the "true" or "false" condition. In the absence of a negative from source 46 transistor 36 will be conductive since a negative signal will be applied to its base element 38 by means of diode 39, resistance 40, and the source of negative potential $-V$.

With transistor 36 in a conducting state, its collector element 35 will have a potential essentially equal to ground potential impressed thereon and discharge current from capacitor 23 will therefore be directed via diode 51 through resistors 48 and 49, as well as through resistor 33.

If, on the other hand, a negative signal from source 46 is applied to base 45 of transistor 43, this transistor will be rendered conductive and its collector element 47 will have a potential essentially equal to ground potential impressed thereon. Diode 39 is selected such that this diode has a substantially greater potential drop than does diode 50. This would be true for example if diode 39 were a silicon diode and diode 50 were a germanium diode. Since collector 47 is at ground potential as a result of transistor 43 being conducting, the necessary voltage drops across diodes 39 and 50 therefore cause transistor 36 to become non-conducting. As a result, capacitor 23 will discharge both through resistor 33 and the resistors 41 and 42, when associated logic circuitry is in the "true" condition.

The rischarge of capacitor 23 will, whether the signal from siurce 46 is of a negative potential indicative of a "true" condition or of ground potential indicative of a "false" condition, be a constant current discharge since emitter 29 of transistor 27 is maintained at a constant potential during discharge. The discharge time may then be determined from the equation:

$$T = \frac{Q}{I_1 + I_2}$$

where T is the delay time of the multivibrator circuit, Q is the initial charge upon capacitor 23, $I_1$ is the current through resistor 33 and $I_2$ is the current through resistors 48 and 49, or through resistors 41 and 42, as the case may be. Thus, by adjusting the values of these elements, various delay periods can be achieved. In particular, by making the sum of resistirs 41 and 42 one particular value and the sum of resistors 48 and 49 a different particular value, different delay times can be achieved dependent upon associated logic circuitry being in either a "true" or a "false" condition. Small adjustments in these delay periods may be achieved by means of adjustments made to the resistors 42 and 49.

Figure 2:
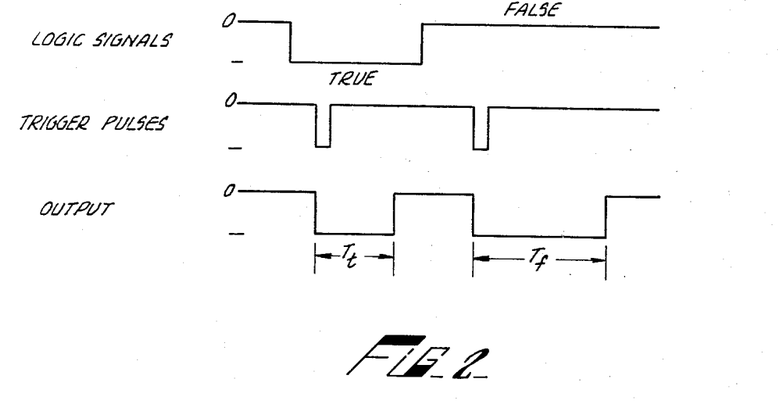
FIG. 2 depicts pulse diagrams indicating output pulses generated by the circuit of FIG. 1 under several different input conditions.

Operation of the multivibrator of FIG. 1 may be more clearly understood from the pulse diagrams shown in FIG. 2. FIG. 2 indicates the logic signals from source 46, trigger pulses from source 16 and output signals applied to terminal 26. The logic pulse source will at all times be in either of two conditions, indicative of associated logic circuitry being either "true" or "false" at any given time. These conditions may be considered as being two distinct signals applied to transistor 43. Thus, as shown in FIG. 2, a negative signal from source 46 is indicative of associated circuitry being in the "true" condition while ground potential is indicative of associated circuitry being in the "false" condition. Two trigger pulses from source 16 are also indicated in FIG. 2, one occurring when the source 46 indicates a "true" condition and the other occurring when the source 46 indicates a "false" condition.

FIG. 2 also indicates output signals appearing at terminal 26 in response to these two trigger pulses. Thus, a first output pulse is shown in response to the first trigger pulse occurring when source 46 indicates the "true" condition and a second and substantially longer output pulse is shown in response to the second trigger pulse occurring when source 46 indicates a "false" condition. Thus, it is seen that two substantially different output signals will appear at terminal 26 with the particular signal determined by the presence or absence of a negative signal from source 46.

It may be noted that the duration of each of the output pulses indicated in FIG. 2 is fixed. Thus, each output signal commences upon the commencement of a trigger pulse and lasts for a predetermined time measured from the commencement of the trigger pulse.

Figure 3:
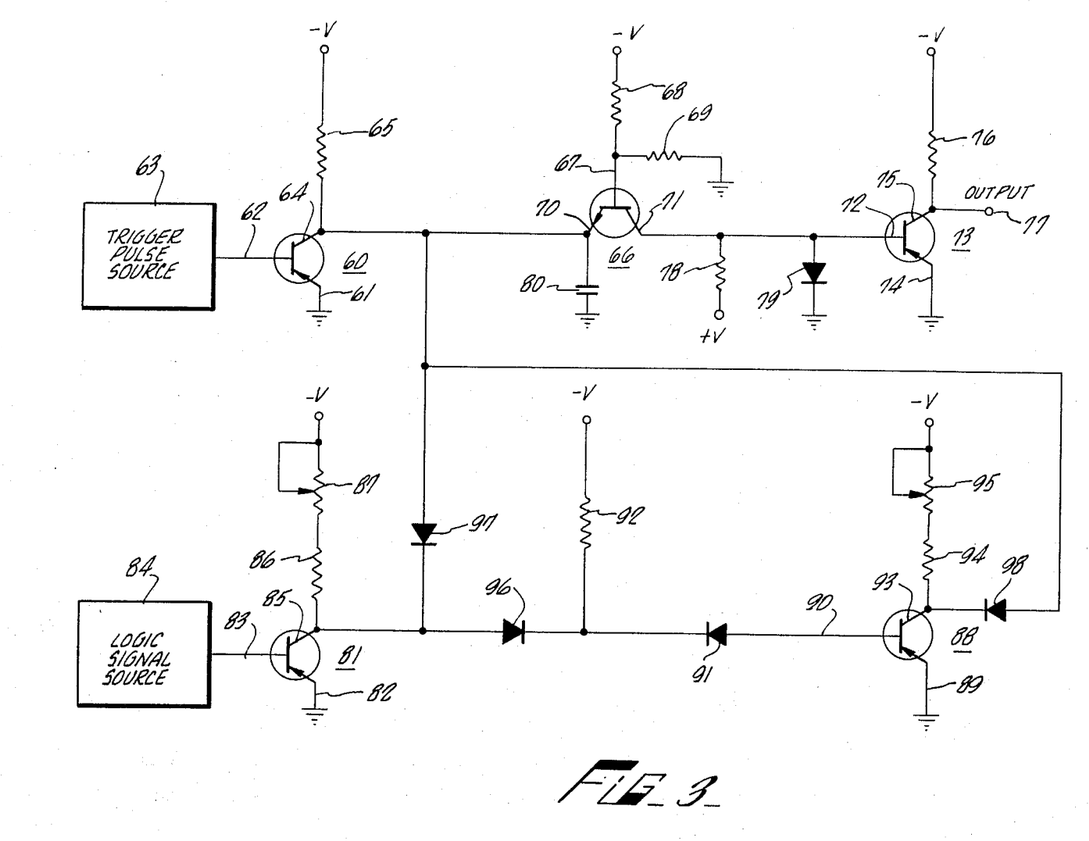
FIG. 3 depicts a delay circuit in which logic signals effect the charging of a timing capacitor through different values of resistance.

In the circuit of FIG. 3, however, it will be seen that output pulses will also have a fixed delay time associated therewith but that this delay time will be measured from the termination of associated trigger pulses rather than from their commencement. Thus, the circuit of FIG. 3 is a delay circuit rather than a multivibrator circuit.

FIG. 3 depicts a programmable delay circuit in accordance with the principles of the present invention. This circuit includes a normally non-conducting PNP transistor 60 having its emitter 61 connected directly to ground, its base 62 connected to a source of trigger pulses 63 and its collector 64 connected through resistor 65 to a source of negative potential V. It also includes a normally conducting NPN transistor 66 having its base element 67 connected to the junction of serially connected resistors 68 and 69 connected between the source of negative potential $-V$ and ground, respectively. Transistor 66 has its emitter 70 connected to the collector element 64 of transistor 60, and has its collector 71 connected to the base 72 of a normally conducting PNP transistor 73. Transistor 73 has its emitter 74 connected to ground and its collector element 75 connected via resistor 76 to the source of negative potential $-V$ and also connected to output terminal 77. A resistor 78 and a diode 79 are both connected between the junction of collector 71 and base 72 and to a source of positive potential $+V$ and ground potential, respectively. A timing capacitor 80 is connected between ground potential and the junction of emitter 70 of transistor 66 and collector 64 of transistor 60. Transistor 60 may be considered a normally open input switch while transistor 73 may be considered a normally closed output switch.

A PNP transistor 81 has its emitter 82 connected directly to ground, its base 83 connected to a source of logic signals 84 and its collector 85 connected through resistor 86 and variable resistor 87 to the source of negative potential —V. A PNP transistor 88 has its emitter 89 connected directly to ground, its base 90 connected via diode 91 and resistor 92 to the source of negative potential —V and its collector 93 connected through resistor 94 and variable resistor 95 to the source of negative potential —V. A diode 96 connects the junction of collector 85 and resistor 86 to the junction of diode 91 and resistor 92. The junction of collector 64 of transistor 60 and resistor 65 is connected to the junction of resistor 86 and diode 96 by diode 97 to the junction of collector 93 and resistor 94 by diode 98.

The trigger pulse source 63 and logic signal source 84 are shown in block diagram form and may represent any well known circuitry capable of performing the functions performed by the similar sources 16 and 46 discussed in connection with the circuit shown in FIG. 1.

As stated previously, the transistors 66 and 73 will be normally conducting while the transistor 60 will be normally non-conducting. Transistor 66 will be normally conducting since its base 67 will be held at a negative potential smaller than —V as determined by the voltage divider action of resistors 68 and 69 whereas its emitter 70 will be at a considerably more negative voltage as determined by resistor 65 and the source of negative potential —V since transistor 60 is normally non-conducting.

The effect of transistor 66 being in a conducting state is to maintain transistor 73 also in a conducting state. This results since conduction within transistor 66 presents a negative voltage to the base 72 of transistor 73, thereby rendering transistor 73 conducting. Conduction within transistor 73 establishes ground potential at its collector 75 which signal is transmitted to output terminal 77.

A negative signal applied to base 62 of transistor 60 from pulse source 63 will render transistor 60 conducting thereby establishing a potential essentially equal to ground potential at collector 64 in turn shutting off transistor 66 and transistor 73. Transistor 66 shuts off since its base potential will now be negative relative to its emitter potential and transistor 73 shuts off since its base potential will be rendered positive relative to its emitter potential by resistor 78 and the source of positive potential +V. Capacitor 80 will at this time completely discharge.

Upon termination of the pulse from source 63, transistor 60 will shut off and at this time none of the three transistors 60, 66, and 73 will be conducting. If the circuitry associated with transistors 81 and 88 is neglected for the moment, capacitor 80 will at this time commence to charge through resistor 65 toward potential —V. Capacitor 80 will not reach the potential —V because transistors 66 and 73 will again be rendered conducting when capacitor 80 is charged to a negative potential less than —V. Thus, whenever the capacitor reaches a potential somewhat more negative than that established on base 67 by the voltage divider resistors 68 and 69, transistors 66 and 73 will again be rendered conductive.

The time within which capacitor 80 is charged to a value sufficient to turn on transistors 66 and 73 is governed by the equation $$T = RC \ln\left(\frac{V}{V-V'}\right)$$

where R is the resistance of resistor 65, C is the capacitance of capacitor 80, V is the value of voltage applied by the source of negative potential —V and V' is the voltage across capacitor 80 when transistors 66 and 73 again becomes conducting.

During the time the transistor 73 is non-conducting its collector 75 will be at a negative potential equally equal to —V and this negative potential will be transmitted to output terminal 77. Thus, this negative output signal will be applied to terminal 77 commencing with the application of a pulse from source 63 to transistor 60 and terminating when capacitor 80 becomes sufficiently charged to again turn on transistors 66 and 73.

It may be seen that while the delay period of the circuit in FIG. 1 was determined by the length of time required to discharge a capacitor, the delay period of the circuit of FIG. 3 is determined by the length of time required to charge a capacitor. Moreover, in the circuit of FIG. 3, this time is measured from the termination of a pulse from source 63 rather than from the moment of initial application of a pulse from source 63.

The circuitry associated with transistors 81 and 88 of FIG. 3 may be utilized to vary the length of time required to charge capacitor 80 sufficiently to turn on transistors 66 and 73. A signal from source 84 will, as did signal source 46 in FIG. 1, apply a negative signal to the base 83 of transistor 81 sufficient to turn on this transistor when associated logic circuitry is in the "true" condition. Similarly, ground potential will be applied to transistor 81 by source 84 when the associated logic circuitry is in the "false" condition. If ground potential is applied by source 84, transistor 81 will be non-conducting and transistor 88 will be conducting. Transistor 88 will conduct since a negative signal will be applied to its base element 90 via diode 91 and resistor 92. Conduction of transistor 88 will establish at its collector 93 a potential substantially equal to ground potential whereas the potential at the junction of diode 97 and resistor 86 will be substantially negative. As a result capacitor 80 will charge through resistor 86 and variable resistor 87 as well as through resistor 65, and the time within which capacitor 80 is sufficiently charged to turn transistors 66 and 73 will be governed by the parallel combination of these resistances.

If, on the other hand, a negative signal is applied from source 84 to transistor 81, transistor 81 will be rendered conducting and its collector 85 will have a potential established thereon essentially equal to ground potential. Transistor 88 will at this time be turned off. Diode 91 is selected to have a substantially greater potential drop than does diode 96. Diode 91 may, for example, be a silicon diode whereas diode 96 may be a germanium diode. Diodes 96 and 91 therefore assure that the potential of base 90 of transistor 88 will be positive relative to emitter 89 when transistor 81 is conductive, therefore cutting off transistor 88. With transistor 88 non-conducting, its collector 93 will be at a potential which is substantially negative with respect to ground whereas the junction of diode 97 and resistor 86 will be at a potential substantially equal to ground potential. As a result, capacitor 80 will charge through resistor 94 and variable resistor 95 as well as through resistor 65 whenever a negative signal is applied to transistor 81 from source 84.

The time in which capacitor 80 charges sufficiently to again turn on transistors 66 and 73 will then be governed in part by the parallel combination of resistors 65, 94 and 95. Thus, it may be seen that the delay time of the circuit shown in FIG. 3 may be made to vary depending upon the presence or absence of a negative signal from source 84 sufficient to render transistor 81 conducting.

Figure 4:
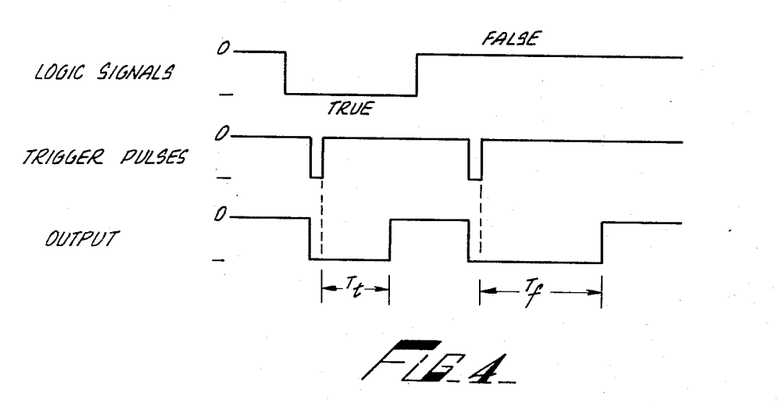
FIG. 4 depicts pulse diagrams indicating output pulses generated by the circuit of FIG. 3 under several different input conditions.

The operation of the circuit of FIG. 3 is further depicted by the pulse diagrams shown in FIG. 4. Thus, a negative signal from source 84 is shown to indicate that associated logic circuitry is in the "true" condition while ground potential is shown to indicate that associated logic circuitry is in the "false" condition. Two trigger pulses from source 63 are also shown in FIG. 4, one occurring when the associated logic circuitry is in the "true" condition and the other occurring when it is in the "false" condition. Finally, two output pulses are shown in FIG. 4 occurring in response to the two trigger pulses. The first output pulse is shown to commence upon the application of the trigger pulse and to continue for a time $T_t$ after the termination of the trigger pulse. The time $T_t$ is the delay time of the circuit of FIG. 3 and would be determined in part by the combined parallel resistance of resistors 65, 94 and 95. A second output pulse is shown in FIG. 4 to commence upon the application of the second trigger pulse and to continue for a period $T_f$ after the termination of the second trigger pulse. This time $T_f$ may be considerably different from the time $T_t$ as shown in FIG. 4 and will be determined in part by the combined parallel resistance of resistors 65, 86 and 87. Thus, it may be seen that the delay time of an output signal appearing at output terminal 77 may be made dependent upon associated logic circuitry being in the "true" or "false" condition. Smaller adjustments in the delay time may be made by means of the variable resistors 87 and 95.

Figure 5:
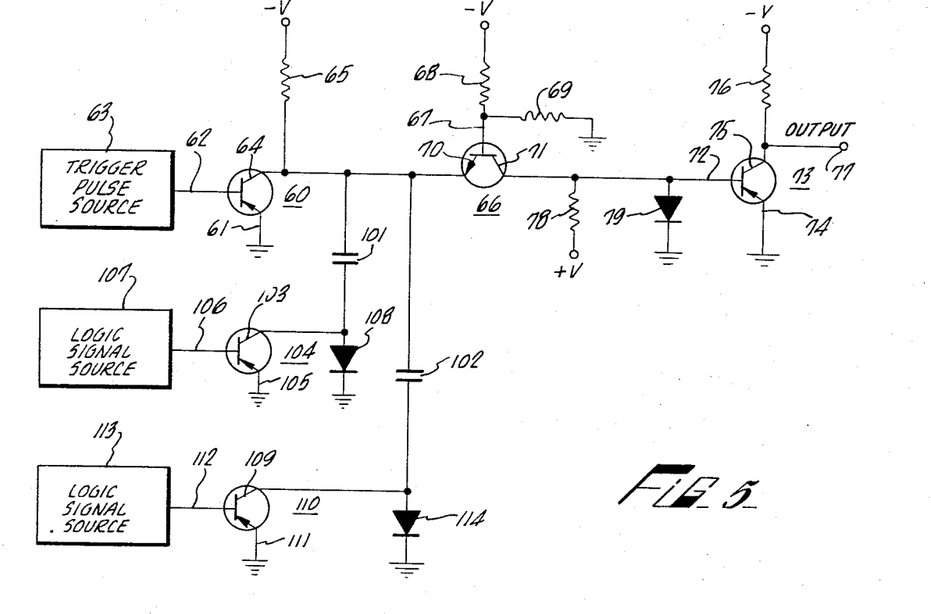
FIG. 5 depicts a delay circuit in which logic signals effect the charging of several different timing capacitors.

The circuit of FIG. 5 depicts a modification of the programmable delay circuit of FIG. 3. Elements appearing both in FIG. 3 and FIG. 5 are denoted by the same reference characters in both figures. Thus, transistors 60, 66, and 73 are shown in both FIG. 3 and FIG. 5. FIG. 5, however, depicts two timing capacitors 101 and 102 rather than the single capacitor 80 of FIG. 3. Capacitor 101 is connected between collector 64 of transistor 60 and collector 103 of PNP transistor 104. Transistor 104 has its emitter 105 connected directly to ground and its base 106 connected to a source of logic signals 107. Collector 103 is also connected to ground via diode 108. Capacitor 102 is connected between collector 64 of transistor 60 and collector 109 of PNP transistor 110. Emitter 111 of transistor 110 is connected to ground and its base 112 is connected to a source of logic signals 113. Collector 109 of transistor 110 is also connected to ground via diode 114.

As in the circuit of FIG. 3, transistors 66 and 73 are normally conducting whereas transistor 60 is normally non-conducting. A pulse from the trigger pulse source 63 similarly renders transistor 60 conducting and transistors 66 and 73 non-conducting.

Neglecting capacitors 101 and 102 for the moment, it may be seen that transistors 66 and 73 would be rendered conducting immediately upon the termination of a pulse from source 63. Thus, there would be no delay in the output signal applied to output terminal 77. If, however, a negative signal is applied from source 107 to transistor 104, this transistor will be rendered conducting and its collector 103 will be at a potential essentially equal to ground potential. Thus, capacitor 101 will, during the application of a negative signal from source 107 be connected between collector 64 of transistor 60 and ground potential just as was capacitor 80 of FIG. 3. A delay time will therefore be introduced into the circuit of FIG. 5 which delay time will be dependent upon the charging of capacitor 101 through resistor 65.

If, however, a negative signal is applied to transistor 110 from source 113, this transistor will be rendered conducting and its associated capacitor 102 will essentially be connected between collector 64 of transistor 60 and ground potential. Thus, if a negative signal from source 113 is applied to transistor 110 in the absence of a pulse from source 107 to transistor 104 the delay time of the circuit of FIG. 5 will be dependent upon the time in which capacitor 102 charges through resistor 65 sufficiently to turn on transistors 66 and 73.

The delay time in the two situations just described is dependent upon the capacitance value of the capacitors 101 and 102. Thus, it may be seen that by making capacitors 101 and 102 of differing capacitance value the delay time of the circuit of FIG. 5 may be made to be of one value when a negative signal is applied from source 107 in the absence of a negative signal from source 113 and of a different value when a negative signal is applied from source 113 in the absence of a negative signal from source 107. Similarly, if negative signals are applied from both sources 107 and 113, the circuit of FIG. 5 will exhibit a third delay time differing from either of the first two and dependent upon the capacitance value of the two parallel connected capacitors 101 and 102. Thus, for example, if capacitor 102 has a capacitance value twice that of capacitor 101, a negative signal from source 107 will introduce a delay time of one unit into the circuit of FIG. 5, a negative signal from source 113 will introduce a two unit delay time into the circuit of FIG. 5, and combined negative signals from both sources 107 and 113 will introduce a three unit delay time into the circuit of FIG. 5.

It may be noted that the diodes 108 and 114 are poled to permit the discharging but not the charging of the timing capacitors via these diodes. Thus the charging of the capacitors and consequently the delay time of the circuit shown in FIG. 5 is dependent upon the state of logic circuitry associated with sources 107 and 113.

Figure 6:
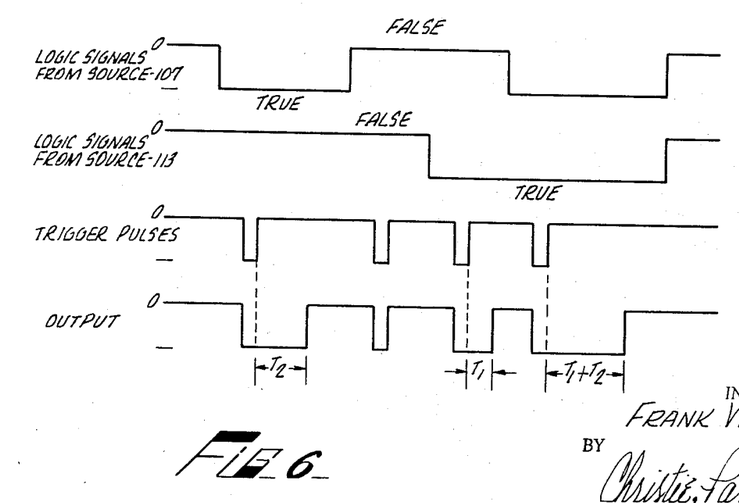
FIG. 6 depicts pulse diagrams indicating output pulses generated by the circuit of FIG. 5 under several different input conditions.

The pulse diagrams shown in FIG. 6 illustrate the operation of the delay circuit shown in FIG. 5. Again negative signals from sources 107 and 113 are indicative of their associated logic circuitry being in the "true" condition whereas ground potential signals from these sources are indicative of their associated logic circuitry being in the "false" condition. Four signals from trigger pulse source 63 are shown in FIG. 6. One occurs during the presence of a negative signal from source 107 and in the absence of a negative signal from source 113 thereby producing an output signal having a delay time indicated by $T_2$. A second trigger pulse from source 63 occurs in the absence of negative signals from either source 107 or source 113 thereby producing an output signal having no delay time. A third pulse from trigger pulse source 63 is shown to occur in the presence of a negative signal from source 113 and in the absence of a negative signal from source 107 thereby producing an ouput signal having a delay time of $T_1$. Finally, a fourth trigger pulse from source 63 is shown to occur in the presence of negative signals from both sources 107 and 113 thereby producing an output signal having a delay time of $T_1+T_2$.

FIG. 7 depicts another modification of the delay circuit shown in FIG. 3. Again elements common to both figures will be given the same reference characters. Base 67 of transistor 66 instead of being simply connected between voltage divider resistors 68 and 69 as in FIG. 3 is shown in FIG. 7 to be connected at the junction of resistor 68 and series connected resistors 69a, 69b and 69c. The collector 121 of PNP transistor 122 is shown in FIG. 7 to be connected at the junction of resistors 69a and 69b. Similarly, collector 123 of PNP transistor 124 is connected to the junction of resistors 69b and 69c. Emitter 125 of transistor 122 is connected directly to ground while base 126 of this transistor is connected to source of logic pulses 129. Emitter 130 of transistor 124 is also connected directly to ground and base 131 of this transistor is connected to source of logic pulses 134.

In a manner similar to the delay circuit described in conjunction with the discussion of FIG. 3, transistor 60 will be normally non-conducting while transistors 66 and 73 will be be normally conducting. Thus, an application of an input signal from trigger pulse source 63 renders transistor 60 conducting and transistors 66 and 73 non-conducting, and causes the discharge of capacitor 80. Upon the removal of the trigger pulse from source 63 capacitor 80 commences to charge and when it reaches a potential slightly greater than the fixed potential of base 67 of transistor 66, both transistors 66 and 73 will again be rendered conducting. Whereas in the circuit of FIG. 3 the potential applied to base 67 of transistor 66 was a constant value independent of the application of logic signals from source 84, the potential of base 67 of transistor 66 in FIG. 7 is not independent of logic signals applied from sources 129 and 134. Thus, if pulses are applied from neither source 129 nor from source 134, base 67 will be held at one particular value of potential and transistors 66 and 73 will be rendered conducting when capacitor 80 charges to this particular value.

If, however, a negative signal is applied from source 129 to transistor 122, this transistor will be rendered conducting. Since the signal from source 129 will be sufficient to saturate transistor 122, its collector 121 will be at a potential valve essentially equal to ground potential. Thus, the junction between resistors 69a and 69b will be at ground potential and the voltage divider action of resistors 69a and 68 will establish a potential at the base 67 of transistor 66 which is substantially lower than that established at this point in the absence of a signal from source 129. Thus, transistors 66 and 88 will begin conducting upon capacitor 80 charging to a much smaller potential than previously and the delay time of the output signal presented to output terminal 77 will be substantially smaller than in the absence of the signal from source 129.

If, on the other hand, a negative signal is applied to transistor 124 from source 134 rather than to transistor 122 from source 121, transistor 124 rather than transistor 122 will be rendered conducting. Since this transistor will also be driven into saturation, its collector 123 will also have a potential essentially equal to ground potential impressed thereon and the junction of resistors 69b and 69c will be set to ground potential. As a result of the voltage divider action of resistors 68 and resistors 69a and 69b, a still different potential will now be applied to base 67 of transistor 66. This potential will be smaller than that impressed upon this point in the absence of signals from either source 129 or 134 but larger than that upon this point in response to a signal from source 129. As a result, transistors 66 and 88 will be rendered conducting by the charging of capacitor 80 to a value intermediate of values in the two cases previously described.

The delay time of the circuit of FIG. 7 is thus dependent upon the presence or absence of signals from sources 129 and 134. This delay time will be greatest in the absence of signals from either of these sources, somewhat shorter in the presence of a signal from source 134 and shortest in the presence of a signal from source 129. The signal presented to transistors 122 and 124 by sources 129 and 134 will advantageously again reflect the condition of logic circuits associated with these circuits.

Figure 8:
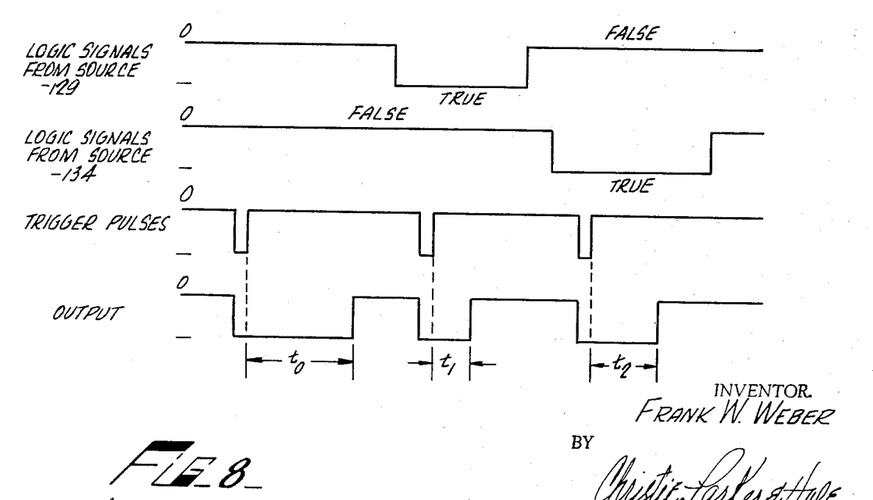
FIG. 8 depicts pulse diagrams indicating output pulses generated by the circuit of FIG. 7 under several different input conditions.

The operation of the circuit of FIG. 7 may be more clearly understood by the pulse diagrams shown in FIG. 8. Source 129 is shown in FIG. 8 to produce a negative signal indicative of a "true" condition in its associated logic circuitry somewhat previously to a similar output signal produced by source 134 indicative of a "true" condition of its associated logic circuitry. Trigger pulse source 63 is shown to produce a first trigger pulse in the absence of negative signals from either source 129 or source 134, a second trigger pulse in the presence of a negative signal from source 129 and a third trigger pulse in the presence of a negative signal from source 134. Output signals presented to output terminal 77 in response to these trigger signals are also indicated. The output signal in response to the first trigger signal is shown to manifest a delay time $t_0$. The output signal in response to the second trigger signal is shown to manifest a delay time $t_1$ and the output signal in response to the third trigger signal is shown to manifest a delay time $t_2$. In accordance with the previous discussion of the circuit of FIG. 7, $t_0$ is shown to be of a time duration longer than that of either $t_1$ or $t_2$ while $t_2$ is shown to be of a duration longer than that of $t_1$.

Several embodiments of the present invention have been described. In each case the time of charging or discharging of a capacitor has been controlled by the application of one or more signals indicative of the state of associated logic circuitry. Thus, in the circuit of FIG. 1 discharge of capacitor 23 was achieved by means of a constant current discharge. The time in which the capacitor discharged from an initial fixed value was dependent upon the constant value of current within the collector to emitter path of transistor 27 which in turn was dependent upon the presence or absence of a negative signal from source 46.

The delay times of the circuits of FIGS. 3, 5, and 7 were all dependent upon the time in which one or more capacitors charged to a particular value. This time is dependent upon the value of resistance in the path through which the capacitor charges, the value of the capacitance, and the value of the potential to which the capacitor charges. All three of these variables were utilized to vary the delay times in the circuit of FIGS. 3, 5, and 7. Thus, in FIG. 3 the value of resistance in the path through which capacitor 80 charges is made to depend upon the presence or absence of a negative signal from source 84. In FIG. 5, the capacitive value of the charging capacitor is made to depend upon the presence or absence of negative signals from sources 107 and 113, and in FIG. 7 the value of the potential to which capacitor 80 charges is made to depend upon the presence or absence of negative signals from sources 129 and 134.

The four means of varying the time in which a capacitor charges or discharges may all be used either singly or in combination in pulse generating circuits to produce output signals of varying predetermined duration or of varying predetermined delay time. Additionally, the present invention may be utilized in connection with pulse generating circuits other than those described herein. Thus, for example, it could be used in conjunction with the delay circuit disclosed in my Patent No. 3,132,261, issued May 5, 1964, or in conjunction with the multivibrator circuit disclosed in my Patent No. 3,171,978, issued Mar. 2, 1965, on an application bearing Ser. No. 138,795, filed on Sept. 18, 1961, and assigned to the assignee of the present invention.

What have been described are considered to be only illustrative embodiments of the present invention and, accordingly, it is to be understood that various and numerous other arrangements may be devised by one skilled in the art without departing from the spirit and scope of this invention.

What is claimed is:

1. An electrical circuit comprising:
   a normally open input switch having a first input terminal, the input switch being closed in response to an input signal applied to the first input terminal,
   a normally closed output switch coupled to the input switch,
   means coupled to the output switch for opening the output switch in response to the closing of the input switch,
   timing circuit means coupled to both the input switch and the output switch and having a first and a second control circuit element and a second input terminal,
   means coupled to the output switch for maintaining the output switch in its open condition for a period of time governed by the timing circuit means,
   means coupled to the timing circuit means for isolating the first control circuit element from the remainder of the timing circuit means in response to a first signal applied to the second input terminal, and
   means coupled to the timing circuit means for isolating the second control circuit element from the remainder of the timing circuit means in response to a second signal applied to the second input terminal.

2. An electrical circuit comprising:
   a normally open input switch having a first input terminal, the input switch being closed in response to an input signal tapplied to the first input terminal,
   a normally closed output switch coupled to the input switch,
   a timing capacitor coupled to both the input switch and output switch,
   a biasing resistor coupled to both the input switch and output switch,
   the capacitor charging through the biasing resistor to a predetermined first value of potential when the input switch is open,
   means coupled to the output switch and including the timing capacitor for opening the output switch in response to the closing of the input switch, a feedback path connected between the input switch and the output switch for maintaining the input switch in a closed condition while the output switch is in an open condition, a first and a second discharge path coupled to the timing capacitor, a second input terminal coupled to the first and second discharge paths, the capacitor discharging through the first discharge path responsive to the presence of an input signal applied to the second input terminal, the capacitor discharging through the second discharge path in the absence of a signal applied to the second input terminal, and means coupled to the output switch for holding the output switch in an open condition until the capacitor discharges to a predetermined second value of potential.

3. An electrical circuit comprising:

a normally open first transistor switch having a first input terminal, the input switch being closed in response to an input signal applied to the first input terminal, a normally closed second transistor switch coupled to the first switch, a timing capacitor coupled to both the first and second switches, a biasing resistor coupled to both the first and second switches, the capacitor charging through the biasing resistor to a predetermined value of potential when the first switch is open, means including the timing capacitor for opening the second switch in response to the closing of the first switch, a feedback path connected between the first switch and the second switch for maintaining the first switch in a closed condition while the second switch is in an open condition, a first and a second discharge path coupled to the timing capacitor, third and fourth transistor switches coupled to the first and second discharge paths, logic circuit means coupled to the third and fourth switches for maintaining one of the third and fourth switches open and the other closed, the capacitor discharging when the first switch is closed, the capacitor discharging through the first discharge path when the third switch is closed and discharging through the second discharge path when the fourth switch is closed, and means coupled to the second switch for holding the second switch in an open condition until the capacitor discharges to a predetermined second value of potential.

4. An electrical circuit according to claim 3 further comprising a fifth transistor switch coupled to the timing capacitor and included within both the first and second discharge paths, and means coupled to the fifth transistor switch for maintaining the fifth transistor switch in a closed condition with its transistor saturated thereby effecting constant current discharge of the timing capacitor.

5. An electrical circuit comprising:

a normally open input switch having a first input terminal, the input switch being closed in response to an input signal applied to the first input terminal, a normally closed output switch coupled to the input switch, a timing capacitor coupled to both the input switch and output switch, the capacitor discharging when the input switch is closed and charging when the input switch is open, means coupled to the output switch for opening the output switch in response to the closing of the input switch, a biasing resistor coupled to both the input switch and output switch, a first and a second charge path coupled to the timing capacitor, a second input terminal coupled to the first and second charge paths, the capacitor charging through the biasing resistor and the first path toward a predetermined first value of potential responsive to the presence of an input signal applied to the second input terminal, the capacitor charging through the biasing resistor and the second path toward the predetermined first value of potential in the absence of an input signal applied to the second input terminal, and means coupled to the output switch for holding the output switch in an open condition until the capacitor charges to a predetermined second value of potential.

6. An electrical circuit comprising:

a normally open first transistor switch having a first input terminal, the first switch being closed in response to an input signal applied to the first input terminal, a normally closed second transistor switch coupled to the first switch, a timing capacitor coupled to both the first and second switches, the capacitor discharging when the first switch is closed and charging when the first switch is open, means coupled to the second switch for opening the second switch in response to the closing of the first switch, a biasing resistor coupled to both the first and second switches, a first and a second charge path coupled to the timing capacitor, third and fourth transistor switches coupled to the first and second charge paths, logic circuit means coupled to the third and fourth switches for maintaining one of the third and fourth switches open and the other closed, the capacitor charging through the biasing resistor and the first path toward a predetermined first value of potential when the third switch is closed and charging through the biasing resistor and the second path toward the predetermined first value of potential when the fourth switch is closed, and means coupled to the second switch for holding the second switch in an open condition until the capacitor charges to a predetermined second value of potential.

7. An electrical circuit according to claim 6 in which the biasing resistor, the first charge path, and the second charge path are all connected in parallel between the holding means and a point maintained at the predetermined first value of potential.

8. An electrical circuit according to claim 6 in which the holding means comprises:

a fifth transistor switch, means coupled to the fifth switch for opening the fifth switch in response to discharge of the capacitor below a particular value of potential, means coupled to the fifth switch for closing the fifth switch in response to charging of the capacitor to the predetermined second value of potential, means coupled to the second switch for opening the second switch in response to the opening of the fifth switch, and means coupled to the second switch for closing the second switch in response to the closing of the fifth switch.

9. An electrical circuit according to claim 6 in which the closing of the first switch in response to an input signal applied to the first input terminal establishes a short circuit across the timing capacitor.

10. An electrical circuit comprising:
   a normally open input switch having a first input terminal, the input switch being closed in response to an input signal applied to the first input terminal,
   a normally closed output switch coupled to the input switch,
   a first timing capacitor coupled to both the input switch and output switch, the capacitor discharging when the input swich is closed,
   means coupled to the output switch for opening the output switch in response to the closing of the input switch,
   a biasing resistor coupled to both the input switch and output switch,
   a normally open first control switch coupled to the first timing capacitor,
   the control switch having a second input terminal and being closed in response to an input signal applied to the second input terminal,
   the first timing capacitor charging through the biasing resistor toward a predetermined first value of potential when the first control switch is closed, and
   means coupled to the output switch for holding the output switch in an open condition until the first capacitor charges to a predetermined second value of potential.

11. An electrical circuit according to claim 10 further comprising:
   a second timing capacitor coupled to both the input switch and output switch, the capacitor discharging when the input switch is closed,
   a normally open second control switch coupled to the second timing capacitor,
   the second control switch having a third input terminal and being closed in response to an input signal applied to the third input terminal,
   the second timing capacitor charging through the biasing resistor toward the predetermined first value of potential when the second control switch is closed, and
   the holding means holding the output switch in an open condition until the second capacitor charges to the predetermined second value of potential.

12. An electrical circuit comprising:
   a normally open first transistor switch having a first input terminal, the first switch being closed in response to an input signal applied to the first input terminal,
   a normally closed second transistor switch coupled to the first switch,
   a first and a second timing capacitor coupled to both the first and second switches, the capacitors discharging when the first switch is closed,
   means coupled to the second switch for opening the second switch in response to the closing of the first switch,
   a biasing resistor coupled to both the first and second switches,
   a normally open third transistor switch coupled to the first timing capacitor, the third switch having a second input terminal and being closed in response to an input signal applied to the second terminal,
   a normally open fourth transistor switch coupled to the second timing capacitor, the fourth switch having a third input terminal and being closed in response to an input signal applied to the third terminal,
   the first timing capacitor charging through the biasing resistor toward a predetermined first value of potential when the third switch is closed,
   the second timing capacitor charging through the biasing resistor toward the predetermined first value of potential when the fourth switch is closed, and
   means coupled to the second switch for holding the second switch in an open condition until at least one of the first and second capacitors charges to a predetermined second value of potential.

13. An electrical circuit according to claim 12 in which the holding means comprises:
   a fifth transistor switch,
   means coupled to the fifth switch for opening the fifth switch in response to discharge of at least one of the first and second capacitors below a particular value of potential,
   means coupled to the fifth switch for closing the fifth switch in response to the charging of at least one of the first and second capacitors to the predetermined second value of potential,
   means coupled to the second for opening the second switch in response to the opening of the fifth switch, and
   means coupled to the second switch for closing the second switch in response to the closing of the fifth switch.

14. An electrical switch comprising:
   a normally open input switch having a first input terminal, the input switch being closed in response to an input signal applied to the first input terminal,
   a normally closed output switch coupled to the input switch,
   a timing capacitor coupled to both the input switch and output switch, the capacitor discharging when the input switch is closed and charging when the input switch is open,
   means coupled to the output switch for opening the output switch in response to the closing of the input switch,
   a biasing resistor coupled to both the input switch and the output switch,
   the capacitor charging through the biasing resistor toward a predetermined first value of potential,
   means coupled to the output switch for holding the output switch in an open condition until the capacitor charges to a predetermined second value of potential,
   a normally open first control switch coupled to the holding means and having a second input terminal, the control switch being closed in response to an input signal applied to the second input terminal, and
   means coupled to the output switch and including the holding means for holding the output switch in an open condition until the capacitor charges to a predetermined third value of potential when the first control switch is closed.

15. An electrical circuit according to claim 14 further comprising:
   a normally open second control switch coupled to the holding means and having a third input terminal, the second control switch being closed in response to an input signal applied to the third input terminal, and
   means coupled to the output switch and including the holding means for holding the output switch in an open condition until the capacitor charges to a predetermined fourth value of potential when the second control switch is closed.

16. An electrical switch comprising:
   a normally open first transistor switch having a first input terminal, the first switch being closed in response to an input signal applied to the first input terminal,
   a normally closed second transistor switch coupled to the first switch,
   a timing capacitor coupled to both the first and second switches, the capacitor discharging when the first switch is closed and charging when the first switch is open,
   a biasing resistor coupled to both the first and second switches, the capacitor charging through the biasing resistor toward a predetermined first value of potential, a third transistor switch having at least one base element coupled to both the first and second switches, means coupled to the second switch for opening the second switch in response to the opening of the third switch, means coupled to the second switch for closing the second switch in response to the closing of the third switch, fourth and fifth transistor switches both coupled to the third switch and having second and third input terminals, respectively, the fourth switch being closed in response to an input signal applied to the second input terminal and the fifth switch being closed in response to an input signal applied to the third input terminal, means coupled to the third transistor switch for establishing a predetermined second value of potential at the base element of the third transistor switch when both the fourth and fifth switches are open, for establishing a predetermined third value of potential at the base element of the third transistor switch when the fourth switch is closed, and for establishing a predetermined fourth value of potential at the base element of the third transistor switch when the fifth switch is closed, and means coupled to the third transistor switch for opening the third transistor switch when the capacitor discharges below the potential established at the base of the third transistor and for closing the third transistor switch when the capacitor charges to a potential greater than that established at the base of the third transistor switch.

References Cited

UNITED STATES PATENTS

| | | | |
|---|---|---|---|
| 3,045,187 | 7/1962 | Belcastro | 328—207 |
| 3,155,959 | 11/1964 | Dobbie et al. | 307—88.5 |
| 3,249,767 | 5/1966 | Zeller | 328—207 |

ARTHUR GAUSS, *Primary Examiner.*

B. P. DAVIS, *Assistant Examiner.*